United States Patent
Schwabe et al.

(10) Patent No.: US 12,032,613 B2
(45) Date of Patent: Jul. 9, 2024

(54) USABILITY IN INFORMATION RETRIEVAL SYSTEMS

(71) Applicant: BASF SE, Ludwigshafen (DE)

(72) Inventors: Henning Schwabe, Ludwigshafen (DE); Arunav Mishra, Ludwigshafen (DE); Juergen Mueller, Ludwigshafen (DE); Michael Schuhmacher, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 366 days.

(21) Appl. No.: 17/373,294

(22) Filed: Jul. 12, 2021

(65) Prior Publication Data

US 2022/0019608 A1   Jan. 20, 2022

(30) Foreign Application Priority Data

Jul. 14, 2020  (EP) .................................... 20185712

(51) Int. Cl.
    *G06F 16/33*   (2019.01)
    *G06F 16/31*   (2019.01)
    (Continued)

(52) U.S. Cl.
    CPC ........ *G06F 16/3344* (2019.01); *G06F 16/316* (2019.01); *G06F 40/211* (2020.01); *G06F 40/30* (2020.01); *G06N 5/04* (2013.01)

(58) Field of Classification Search
    CPC .. G06F 16/3344; G06F 16/316; G06F 40/211; G06F 40/30; G06N 5/04
    (Continued)

(56) References Cited

U.S. PATENT DOCUMENTS 9,110,977 B1 *  8/2015  Pierre ..................... G06F 16/48
9,645,993 B2 *  5/2017  Zuev ....................... G06F 40/58
(Continued)

OTHER PUBLICATIONS

Jun Zhang et al., "Si-SEEKER: Ontology-Based Semantic Search over Databases", Jan. 1, 2006, Knowledge Science, Engineering and Management Lecture Notes in Computer Science; Lecture Notes in Artificial Intelligence; LNCS, Springer, Berlin, DE, pp. 599-611.

(Continued)

*Primary Examiner* — Susan I McFadden
(74) *Attorney, Agent, or Firm* — LOWENSTEIN SANDLER LLP (57) ABSTRACT

In order to facilitate a search and identification of documents, an information retrieval system is provided for performing a search on a corpus of data objects. The information retrieval system comprises a device and a database. The database is configured to store at least one syntactic search index data structure and at least one semantic search index data structure. The syntactic search index data structure is configured to index and store in the database a plurality of terms from the corpus of data objects along with syntactic annotations indicating syntactic information. The at least one semantic search index data structure is configured to index and store in the database the plurality of terms from the corpus of data objects along with semantic annotations indicating semantic information. The device comprises an input unit, a processing unit, and an output unit. The input unit is configured to receive a syntactic query and a semantic query. The processing unit is configured to match the syntactic query against the syntactic search index data structure to obtain a first set of data objects, each of which has a set of terms that are syntactically related to the syntactic query. The processing is configured to match the semantic query against The at least one semantic search (Continued)

index data structure to obtain second set of the data objects, each of which has a set of terms that are semantically related to the semantic query, wherein the second set of data objects is a sub-set of the first set of the data objects. The output unit is configured to output information of the second set of data objects.

15 Claims, 6 Drawing Sheets

(51) Int. Cl.
  *G06F 40/211* (2020.01)
  *G06F 40/30* (2020.01)
  *G06N 5/04* (2023.01)
(58) Field of Classification Search
  USPC .............................................................. 704/9
  See application file for complete search history.

(56) References Cited

U.S. PATENT DOCUMENTS

| 10,515,125 | B1* | 12/2019 | Lavergne ................. G06F 16/93 |
| 11,694,033 | B2* | 7/2023 | Farmer ............... G06F 16/3329 |
|  |  |  | 704/9 |
| 2010/0174704 | A1 | 7/2010 | Ciravegna et al. |
| 2011/0270607 | A1 | 11/2011 | Zuev |
| 2014/0114649 | A1* | 4/2014 | Zuev ....................... G06F 16/93 |
|  |  |  | 704/9 |
| 2016/0041986 | A1 | 2/2016 | Nguyen |
| 2018/0121326 | A1* | 5/2018 | Qi ....................... G06F 11/3636 |
| 2019/0266180 | A1 | 8/2019 | Dimassimo et al. |

OTHER PUBLICATIONS

European Search Report for EP Patent Application No. 20 185 712.5, dated Oct. 29, 2020, 12 pgs.

Fader, et al., "Paraphrase-driven learning for open question answering," Proc. 51st Annual Meeting of the ACL (vol. 1: Long Papers), 2013, pp. 1608-1618.

Berant, et al., "Semantic parsing on freebase from question-answer pairs," Proceedings of the 2013 Conference on Empirical Methods in Natural Language Processing, Oct. 2013, pp. 1533-1544.

Bordes, et al., "Open question answering with weakly supervised embedding models," Machine Learning and Knowledge Discovery in Databases, vol. 8724 of the series Lecture Notes in Computer Science, 2014, pp. 165-180.

Wang, et al., "Building a semantic parser overnight," Proc. 53rd Annual Meeting of the ACL and 7th Intl Joint Conf. on Natural Language Processing of the Asian Federation of Natural Language Processing (ACL 2015), vol. 1: Long Papers, 2015, pp. 1332-1342.

* cited by examiner

USABILITY IN INFORMATION RETRIEVAL SYSTEMS

CROSS REFERENCE TO RELATED APPLICATION(S)

This application claims the benefit of priority of European Patent Application No. 20185712.5, filed Jul. 14, 2020, the disclosure of which is hereby incorporated by reference herein in its entirety.

FIELD OF THE INVENTION

The present invention generally relates to information retrieval and in particular to an information retrieval system, a computer-implemented method for performing a search on a corpus of data objects, and a computer program.

BACKGROUND OF THE INVENTION

Conventional search tools return a list of documents in response to a syntactic query. The documents from the list may be ranked according to their relevance to the syntactic query. For example, highly relevant documents may be ranked higher than, and may be displayed in a list above, documents of a lesser relevance. This allows a user to quickly and conveniently identify the most relevant documents retrieved in response to the query.

Users of search services who have expert knowledge are partially familiar with the underlying data corpus. Therefore, they are more susceptible than lay persons (e.g. consumers) to irritation and mistrust resulting from intransparent search results.

SUMMARY OF THE INVENTION

There may be a need to facilitate a search and identification of documents.

The object of the present invention is solved by the subject-matter of the independent claims, wherein further embodiments are incorporated in the dependent claims. It should be noted that the following described aspects of the invention apply also for the information retrieval system, the computer-implemented method, and the computer program.

According to a first aspect of the present invention, there is provided an information retrieval system for performing a search on a corpus of data objects. The information retrieval system comprises a device and a database. The database is configured to store at least one syntactic search index data structure and at least one semantic search index data structure. The syntactic search index data structure is configured to index and store in the database a plurality of terms from the corpus of data objects along with syntactic annotations indicating syntactic information. The at least one semantic search index data structure is configured to index and store in the database the plurality of terms from the corpus of data objects along with semantic annotations indicating semantic information.

The device comprises an input unit, a processing unit, and an output unit. The input unit is configured to receive a syntactic query and at least one semantic query. The processing unit is configured to match the syntactic query against the at least one syntactic search index data structure to obtain a first set of data objects, each of which has a set of terms that are syntactically related to the syntactic query. The processing unit is configured to match the at least one semantic query against the at least one semantic search index data structure to obtain a second set of the data objects, each of which has a set of terms that are semantically related to the at least one semantic query. The processing unit is configured to obtain an intersection of the first and second sets of data objects. The output unit is configured to output information of the intersection of the first and second sets of data objects.

A corpus of data objects is a collection of data objects including e.g. documents, graphical images, bitmaps, music, video data, and/or audio data. To accommodate searching of the collection, each data object in the collection is syntactically parsed, indexed, and stored. In other words, any collection of terms, phrases, units, images or other objects in the collection may be represented in syntactical units and that follow a grammar that defines and assigns roles to the syntactical units. In addition, each data object in the collection is semantically parsed, indexed, and stored. In other words, any collection of terms, phrases, units, images or other objects may be classified into one of a set of predefined sematic categories, e.g. a set of predefined expert domains relevant to a target user group, such as chemical species, chemical structure, etc. The additional semantic search may consider a search context, intent of the search, a type of query (e.g. generalized query, specific query, specialized query, etc.), concept matching, and any combinations thereof, to provide relevant search results. The semantic search may be configured to disambiguate terms based on the context of the semantic query to form a semantic understanding. For example, the semantic query may include one or more terms and/or sentences describing a particular material, property, apparatus, and/or method, and the like, which are also referred to as expert domain to a target user group.

In an example, the corpus of data objects may comprise production plant documentation. A user may further specify, with the aid of the semantic query, data as production data coming from a particular plant sensor (e.g. temperature sensors, pressure sensors, and the like). This may have benefits such as faster faultfinding, resulting in improved availability of equipment.

In an example, the corpus of data objects may comprise patent documents. The syntactic query may include insecticide resistance. The user may further specify, via the semantic query, that the species of insects is *lepidoptera*.

Using syntactic queries may give the expert user the benefit to define in verbatim the context he/she is looking for.

Using semantic queries pulls additional synonyms and word constellations into the definition of the context and therefore selection of the results. The expert user may accept definitions of semantic context that are wider than his/her own preferences. The expert user may accept additional expertise coming via the definition of the semantic index and matching algorithm.

The intersection is the set containing all data objects of the first set of data objects that also belong to the second set of data objects (or equivalently, all data objects of the second set of data objects that also belong to the first set of data objects).

If one of the query types, i.e. syntactic and semantic query, is empty, the matching may rely on the non-empty part. For example, for a query where there is only a semantic query term and no syntactic one, the matching may reply on the non-empty semantic query term.

Therefore, users of search services who are familiar with the underlying data corpus may directly apply his/her expert knowledge by using the semantic query to retrieve a set of data objects. Accordingly, the search results are readily explained by comparison to the syntactic query and by readily comparison of the attribute from the search result list. In particular, combining syntactic query and arbitrary set of semantic queries allows to tune the query on the whole semantic spectrum from very narrow (using syntactic query) to very wide (using a single semantic index). For example, narrow search may be suitable for document location in a large corpus, such as "Archive retrieval". For example, wide search may be suitable for exploration of corpus allowing for serendipity.

According to an embodiment of the present invention, the at least one semantic query comprises a first semantic query and a second semantic query. The processing unit is configured to match the first semantic query against a first semantic search index data structure to obtain a third set of data objects, each of which has a set of terms that are semantically related to the first semantic query. The processing unit is configured to match the second semantic query against a second semantic search index data structure to obtain a fourth set of data objects, each of which has a set of terms that are semantically related to the second semantic query. The second set of data objects is an intersection of the third and fourth sets of data objects.

In an example, the first and second semantic search index data structures may be associated with different semantic query categories, such as "text semantic" and "chemical structure". For example, the semantic annotations in the first semantic search index data structure may be related to "text semantic", while the semantic annotations in the second semantic search index data structure may be related to "chemical structure".

In other words, the matching may rely on the combination of two semantic query categories (e.g. "text semantic" and "chemical structure").

According to an embodiment of the present invention, the processing unit is configured to generate a total score for each of data objects from the intersection of the first and second sets of data objects according to their relevance to the syntactic query and to the at least one semantic query and to rank the data objects according to the total score.

The total score reflects the relevance of each data objects to the syntactic query and to the semantic query.

For example, a syntactic score may be generated for each of the data objects according to their relevance to the syntactic query, and a semantic score may be generated for each of the data objects according to their relevance to the semantic query.

The total score may be a weighted score sum of the syntactic score and the semantic score. The weighting factor for the semantic score and the syntactic score may be ranged between 0 and 1, such as 0, 0.1, 0.2, 0.3, 0.4, 0.5, 0.6, 0.7, 0.8, 0.9, and 1.

According to an embodiment of the present invention, the processing unit is configured to prioritize an output of the information of data objects from the intersection of the first and second sets of data objects with the total score within a reference score range.

Accordingly, the information of the most relevant data objects will be displayed.

According to an embodiment of the present invention, the processing unit is configured to generate child and parent concepts for each of the at least one semantic query. The output unit is configured to output the generated child and parent concepts.

For example, if the queried semantic concept is "pesticide", the child concept may include one or more of herbicide, insecticides (which may include insect growth regulators, termiticides, etc.), nematicide, molluscicide, piscicide, avicide, rodenticide, bactericide, insect repellent, animal repellent, antimicrobial, and fungicide.

The parent concept may allow the users to broaden the search results by including data objects under the parent concept, whereas the child concept may allow the users to further limit the search results to the child concept. For example, if sematic query is pesticide, the user may choose the child concept "herbicide" to further limit the search results.

According to an embodiment of the present invention, the input unit is configured to receive a user feedback on an alternative label of at least one semantic query. The processing unit is configured to update the semantic annotations based on the user feedback.

Semantic parsers may estimate conditional probabilities based upon supervised classification methods trained with labelled utterances. By updating the labeled utterances with the user feedback, the semantic parsers may provide more accurate search results.

According to an embodiment of the present invention, the at least one semantic search index structure is configured to store semantic indexing of an expert domain relevant to a target user group.

In other words, the semantic query may include one or more terms and/or sentences describing a particular material, property, apparatus, method, and the like. This may allow users of search services to apply their expert knowledge in the searching process, which may thus improve the transparency and reliability of the search results.

According to an embodiment of the present invention, the expert domain comprise at least one of: organic chemical, inorganic chemical, polymer, material comprising any of the former, biological species, chemical property, physical property, chemical reaction, process, and chemical, biological, and physical application, specification of an technical object, technical process, technical component part, and specification of manufacturing process to manufacture any of the former, and regulatory legal text or part thereof comprising environmental, health and/or safety regulation information.

In an example, the expert domain may comprise author of document and/or data object.

According to an embodiment of the present invention, the expert domains comprise at least one of: legal entity from business, governmental administration, public services, international organization, non-profit organization, geographical location of legal entity, and/or academia, and product and brand name.

In an example, the expert domain may comprise and employee and/or member of organization mentioned above.

According to an embodiment of the present invention, the expert domains comprise at least one of: ingredients for manufacturing of regulated products, genome data, and proteome data.

According to an embodiment of the present invention, the expert domains comprise at least one of: image and scientific plot.

According to an embodiment of the present invention, the device further comprises a display configured to display the information of one or more of the second set of data objects.

According to an embodiment of the present invention, the database is configured to store meta data of each of data objects in the corpus. The input unit is configured to receive a metadata query. The processing unit is configured to match the metadata query against metadata of data objects from the intersection of the first and second sets of data objects to obtain a fifth set of data objects. The output unit is configured to output information of the fifth set of data objects.

For example, the meta data for a patent documents may include e.g. publication date, countries, inventors, etc.

Users of the search services may further limit the number of search results by specifying e.g. the publication date and countries of the application documents.

According to an embodiment of the present invention, the information retrieval system further comprises a central document store with documents in normalized format, ingested from a number of separate document storage systems. The corpus of data objects are obtained from the central document store.

In other words, the information retrieval system may pre-process the corpus of data objects to ensure a consistent data format and store the processed corpus of data objects in a central document store.

According to a second aspect of the present invention, there is provided a computer-implemented method for performing a search on a corpus of data objects. The computer-implemented method comprises the following steps:
 a) receiving, via an input channel, a syntactic query and at least one semantic query;
 b) matching, by a processor, the syntactic query against at least one syntactic search index data structure to obtain a first set of data objects, each of which has a set of terms that are syntactically related to the syntactic query, wherein the syntactic search index data structure indexes and stores in a database a plurality of terms from the corpus of data objects along with syntactic annotations indicating syntactic information;
 c) matching, by the processor, the semantic query against at least one semantic search index data structure to obtain second set of the data objects, each of which has a set of terms that are semantically related to the semantic query, wherein the at least one semantic search index data structure indexes and stores in the database the plurality of terms from the corpus of data objects along with semantic annotations indicating semantic information;
 d) obtaining, by the processor, an intersection of the first and second sets of data objects; and
 e) providing, via an output channel, information of the intersection of the first and second sets of data objects.

According to another aspect of the present invention, there is provided a computer program enabling a processor to carry out the method.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

These and other aspects of the invention will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
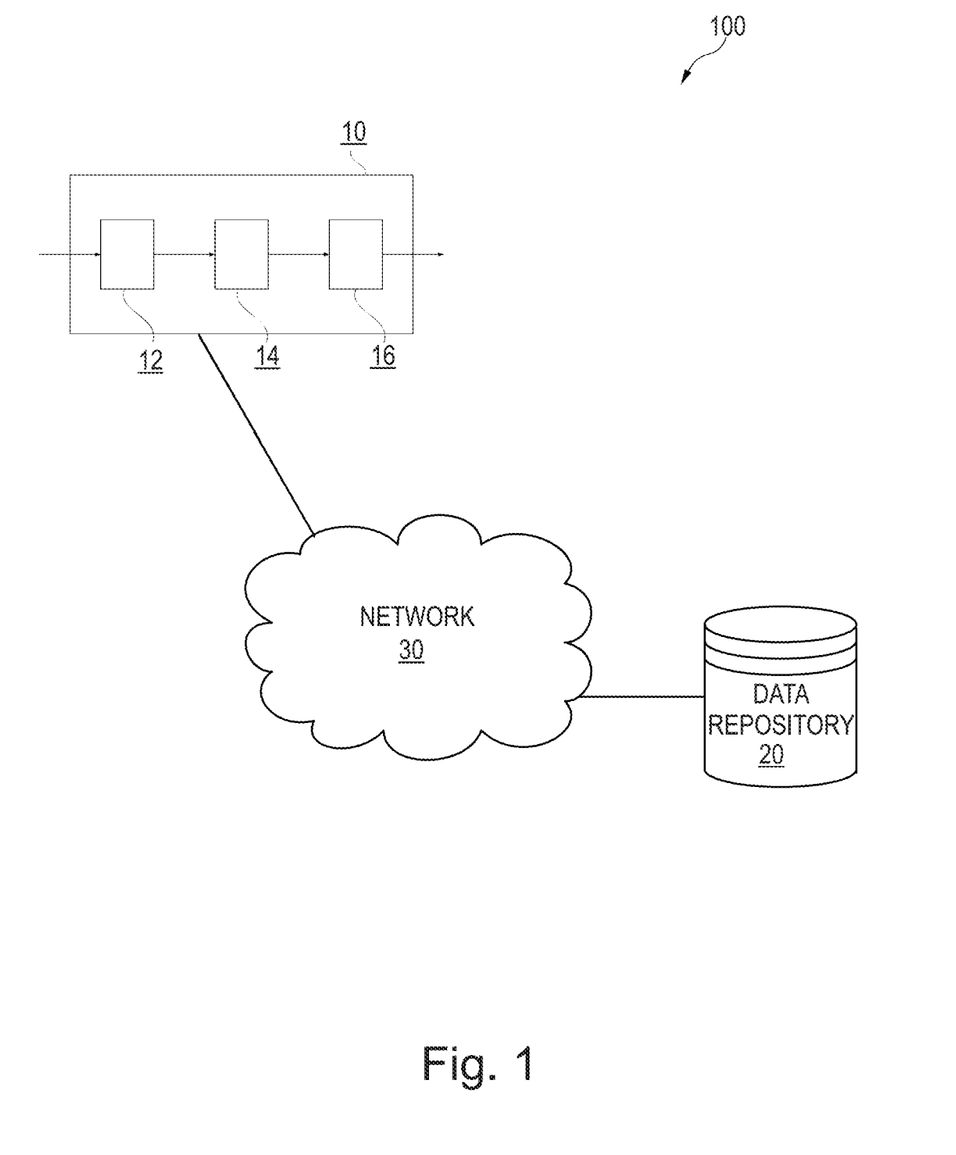
FIG. 1 illustrates an exemplary block gram of an information retrieval system.

FIG. 1 is an exemplary block diagram of an information retrieval system 100 for performing a search on a corpus of data objects. Although a specific number of components are depicted in FIG. 1, any number of these components may be provided. Furthermore, the functions provided by one or more components of the information retrieval system 100 may be combined or separated. Moreover, the functionality of any one or more components of the information retrieval system 100 may be implemented by any appropriate computing environment.

With reference to FIG. 1, the information retrieval system 100 may include a device 10, a database 20 and a network 30.

The database 20 is configured to store at least one syntactic search index data structure and at least one semantic search index data structure. The at least one syntactic search index data structure is configured to index and store in the memory a plurality of terms from the corpus of data objects along with syntactic annotations indicating syntactic information. The at least one semantic search index data structure is configured to index and store in the memory the plurality of terms from the corpus of data objects along with semantic annotations indicating semantic information. The corpus of data objects may be associated with any subject matter, such as legal, scientific, and/or financial. In some examples, the at least one semantic search index data structure may comprise two or more semantic search index data structures, such as a first semantic search index data structure and a second semantic search index data structure, which may be associated to different semantic query categories, such as "text semantic" and "chemical structure".

Moreover, although shown as separate components in FIG. 1, the device 10 and the database 20 may be combined. For example, the device 10 may include one or more databases in addition to or instead of the database 20. The database 20 may also be distributed over multiple databases.

An exemplary configuration of the information retrieval system for generating the indexed data structure will be described hereafter in conjunction with FIG. 2.

The device 10 may be used for performing computing tasks, such as legal research and other types of research. For example, the device 10 may be a desktop computer, laptop computer, or other mobile device. The device 10 may include an input unit 12, a processing unit 14, and an output unit 16.

The input unit 12 may access user data, such as a user supplied query. The input unit 12 may access data over the network 30. The input unit 12 is configured to receive a syntactic query and at least one semantic query, each of which may comprise one or more query components. The query components may include e.g. a word, a clause, a sentence, etc. The input unit may be connected to a user interface, which may include user-selectable tabs, buttons, click-links, pull-down menus, and text inputs for receiving user data and user selections.

An exemplary implementation of the user interface will be described hereafter in conjunction with FIGS. 4 and 5.

Thus, the input unit 12 is, in an example, implemented as an Ethernet interface, a USB™ interface, a wireless interface such as a WiFi™ or Bluetooth™ or any comparable data transfer interface enabling data transfer between input peripherals and the processing unit 14.

The processing unit 14 is configured to match the syntactic query against the syntactic search index data structure to obtain a first set of data objects, each of which has a set of terms that are syntactically related to the syntactic query.

The processing unit 14 is configured to the processing unit is configured to match the at least one semantic query against the at least one semantic search index data structure to obtain a second set of the data objects, each of which has a set of terms that are semantically related to the at least one semantic query.

Optionally, the at least one semantic query may comprise a first semantic query and a second semantic query. The processing unit 14 may be configured to match the first semantic query against a first semantic search index data structure to obtain a third set of data objects, each of which has a set of terms that are semantically related to the first semantic query. The processing unit 14 may be configured to match the second semantic query against a second semantic search index data structure to obtain a fourth set of data objects, each of which has a set of terms that are semantically related to the second semantic query. The first and second semantic search index data structures are associated with different semantic query categories. The second set of data objects is an intersection of the third and fourth sets of data objects. In other words, the matching may rely on the combination of two or more semantic query categories, such as "chemical structure" and "scientific plot".

If the syntactic query and/or the at least one semantic query comprises a plurality of query components, these query components may be combined into one or more combined query terms e.g. by at least one of a Boolean operator, a domain specific heuristic algorithm, and a learning to rank algorithm.

The processing unit 14 is configured to obtain an intersection of the first and second sets of data objects. The intersection is the set containing all data objects of the first set of data objects that also belong to the second set of data objects (or equivalently, all data objects of the second set of data objects that also belong to the first set of data objects). It is noted that the intersection is performed between non-empty sets of data objects, and empty sets of data objects are ignored in performing the intersection.

An exemplary implementation of the device for addressing the query process will be described hereafter in conjunction with FIG. 3.

Thus, the processing unit 14 may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logical circuit, and/or other suitable components that provide the described functionality. Furthermore, such processing unit 14 may be connected to volatile or non-volatile storage, display interfaces, communication interfaces and the like as known to a person skilled in the art. A skilled person will appreciate that the implantation of the processing unit 14 is dependent on the compute intensity and latency requirements implied by the selection of signals used to represent positional information in a particular implementation.

The output unit 16 is configured to output information of the intersection of the first and second sets of data objects, e.g. to a visual display.

Thus, the output unit 16 is, in an example, implemented as an Ethernet interface, a USB™ interface, a wireless interface such as a WiFi™ or Bluetooth™ or any comparable data transfer interface enabling data transfer between output peripherals and the processing unit 16.

The network 30 in the information retrieval system 100 may facilitate communications between various devices in the information retrieval system 100, such as the device 10 and the database 20. The network 30 may be a shared, public or private network. The network 30 may encompass a wide area or local area and may be implemented through any suitable combination of wired and/or wireless communication networks. Furthermore, the network 30 may comprise a local area network (LAN), a wide area network (WAN), an intranet, or the internet.

Figure 2:
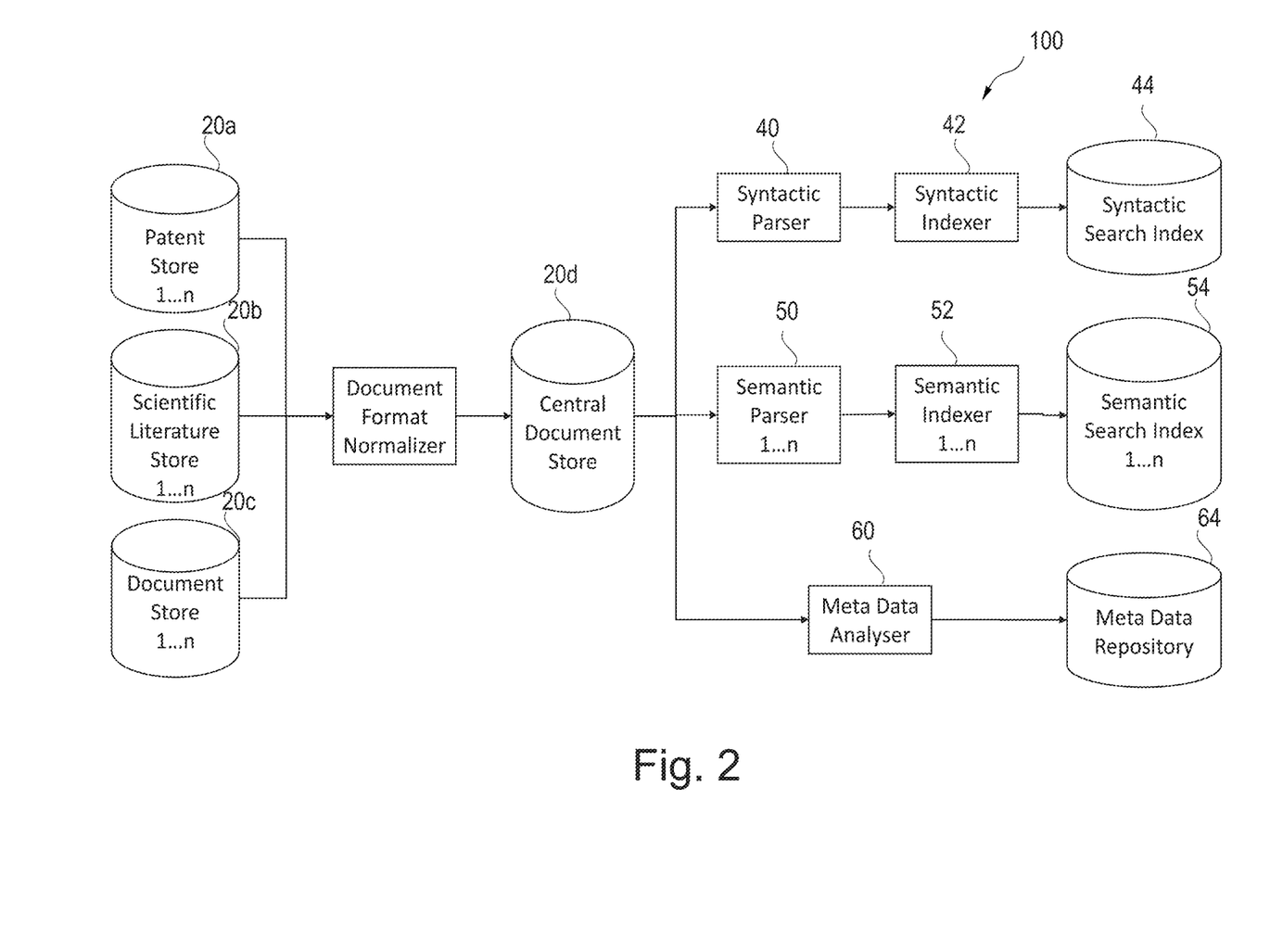
FIG. 2 illustrates an exemplary configuration of the information retrieval system for generating the indexed data structure.

FIG. 2 illustrates an exemplary block diagram of an implementation of the information retrieval system 100 for generating the indexed data structure. Specifically, the information retrieval system 100 receives a corpus of data objects, for example, a set of documents. The documents may be received electronically, scanned in, or communicated by any reasonable means. In the example shown in FIG. 2, the documents may be received from one or more databases 20*a*, 20*b*, 20*c* that store e.g. patent documents, scientific literature, etc. The information retrieval system 100 may pre-process the corpus of data objects to ensure a consistent data format and store the processed corpus of data objects in a central document store 20*d*.

The information retrieval system 100 may comprise a syntactic parser 40 configured to parse the data objects, identify entity type tags, and the syntax and grammatical roles of terms with the data objects as appropriate to the configured parsing level. The parsing level may be configured using a range of parsing levels, from "deep" parsing to "shallow" parsing. Deep parsing decomposes a data object into syntactic and grammatical units using sophisticated syntactic and grammatical roles and heuristics. Shallow parsing decomposes a data object to recognize attribute of a portion or all of a data object, such as entity types specified by a default custom ontology associated with the corpus.

The information retrieval system 100 may comprise a syntactic indexer 42 configured to syntactically index the parsed data objects, e.g. using term-clause index, that indexes terms and syntactic annotations at the clause level. Other examples of the index include a sentence index, a document index, etc. The syntactically parsed sentences are then stored in a syntactic search index repository 44.

The information retrieval system 100 may further comprise a semantic parser 50 configured to classify natural language utterances into one of a set of predefined semantic categories and extract related arguments using semantic classifier.

For example, the semantic parser 50 may be configured to classify natural language utterance into one of a set of predefined expert domains relevant to a target user group. For example, a plurality of semantic search index data structures may be provided, each of which may have semantic annotations indicating semantic information associated with different predefined expert domains. Combining arbitrary set of semantic queries may allow to tune the query on the whole semantic spectrum from a single semantic index to a combination of multiple semantic indices.

In an example, the expert domains may include one or more semantic annotations labelling e.g. organic chemical, inorganic chemical, polymer, material comprising any of the former, biological species, chemical property, physical property, chemical reaction, process, chemical, biological, and/or physical application, specification of an technical object, technical process, and/or technical component part, specification of manufacturing process to manufacture any of the former, and regulatory legal text or part thereof comprising environmental, health, and/or safety regulation information.

In another example, the expert domains may include one or more semantic annotations labelling legal entity from business, governmental administration, public services, international organization, non-profit organization, and/or academia, geographical location of legal entity, and/or product and brand name. For example, when searching for digital farming solutions, the user may specify, via the semantic query, "Xarvio™" as brand names.

In a further example, the expert domains may include one or more semantic annotations labelling image and/or scientific plot. For example, when searching for patent documents, the user may specify, via the semantic query, that relevant drawings of search results are displayed.

In some examples, semantic parsers may estimate conditional probabilities based upon supervised classification methods trained with labelled utterances. See, for example, Fader, et al., "Paraphrase-driven learning for open question answering," Proc. 51st Annual Meeting of the ACL (Vol. 1: Long Papers), pp. 1608-1618, 2013; Berant, et al., "Semantic parsing on freebase from question-answer pairs," Empirical Methods in Natural Language Processing (EMNLP). vol. 2, no. 5, p. 6, 2013; Bordes, et al., "Open question answering with weakly supervised embedding models," Machine Learning and Knowledge Discovery in Databases, Vol. 8724 of the series Lecture Notes in Computer Science, pp. 165-180, 2014.

In some examples, semantic parsers may be built for new knowledge bases and domains when no training data initially exists. See, for example, Wang, et al., "Building a semantic parser overnight," Proc. 53rd Annual Meeting of the ACL and 7th Intl Joint Conf. on Natural Language Processing of the Asian Federation of Natural Language Processing (ACL 2015), Vol. 1: Long Papers, pp. 1332-1342, 2015, hereinafter, Wang 2015).

The information retrieval system 100 may further comprise a semantic indexer 52 configured to semantically index the parsed data objects, e.g. using term-clause index, that indexes terms and semantic annotations at the clause level. Other examples of the index include a sentence index, a document index, etc. The semantically parsed sentences are then stored in a semantic search index repository 54.

Optionally, the information retrieval system 10 may further comprise a meta data analyzer 60 configured to analyze e.g. publication date, publication number, applicants, inventors, etc. of a patent application. The meta data is then stored in a metadata repository 64.

After storing the data set, the information retrieval system can process syntactic query and the at least one semantic query against the data set.

Figure 3:
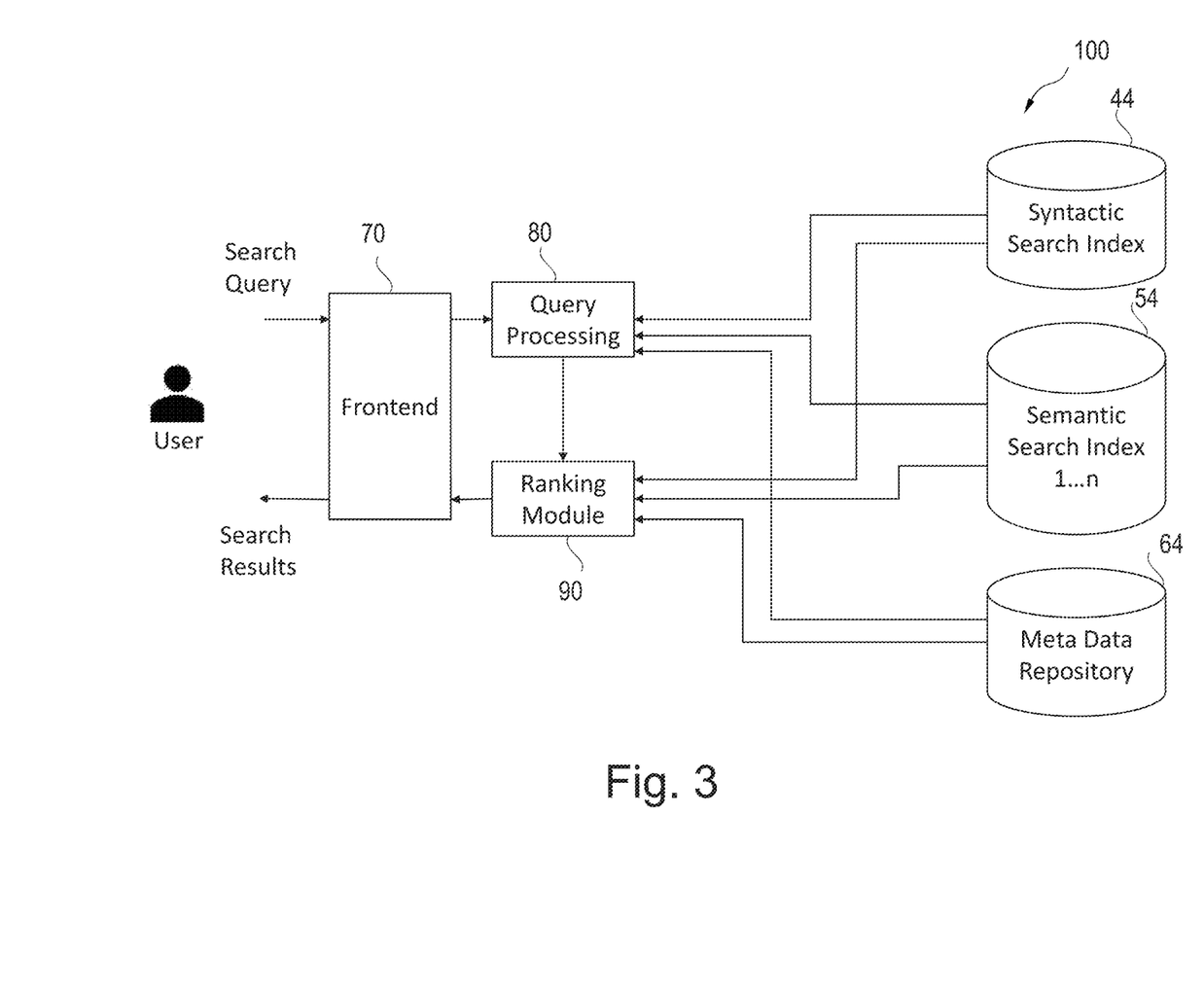
FIG. 3 illustrates an exemplary implementation of the device for addressing the query process.

FIG. 3 illustrates an exemplary implementation of the information retrieval system for addressing the query process.

The information retrieval system 100 may comprise a frontend 70 that is directly accessed and interacted with by a user to receive a syntactic query and at least one semantic query. The syntactic query and the at least one semantic query may be received e.g. through a user interface such as that shown in FIGS. 4 and 5 below. Alternatively, one skilled in the art will recognize that the syntactic query and the at least one semantic query may be transmitted through a function call, batch process, or translated from some other type of interface.

The information retrieval system 100 may further comprise a query processing module 80, which is configured to combine the one or more query components into one or more combined query terms e.g. by at least one of a Boolean operator, a domain specific heuristic algorithm, and a learning to rank algorithm. In other words, the query processing module 80 may preprocess the received syntactic query and the at least one semantic query and transform it into a query language understood by the system. For example, natural language query may be parsed into syntactic units with grammatical roles, and the relevant entity and action terms are transformed into query language understood by the system. The query processing module 80 then matches the syntactic query against the at least one syntactic search index data structure in the syntactic search index repository 44 to obtain a first set of data objects and to match the at least one semantic query against the at least one semantic search index data structure against the at least one semantic search index structure in the semantic search index repository 54 to obtain a second set of data objects. The query processing module 80 then obtains an intersection of the first and second sets of data objects. Optionally, the query processing 80 may also perform a search in the meta data repository 64. In an example, the query processing module 80 may execute a keyword search engine to process the query. The query processing module 80 may return a total score for relevant information in each data object indicating a set of terms in the respective data object that are syntactically and semantically related to the one or more combined query terms.

The information retrieval system 100 may further comprise a ranking module 90 configured to prioritize an output of one or more data objects comprising the relevant information based on the associated score, e.g. by displaying them through a user interface.

For example, the processing unit 14 may generate a total score for each of data objects from the intersection of the first and second sets of data objects according to their relevance to the syntactic query and to the at least one semantic query and to rank the data objects according to the total score.

For example, a syntactic score may be generated for each of the data objects according to their relevance to the syntactic query, and a semantic score may be generated for each of the data objects according to their relevance to the semantic query. The total score is a weighted score sum of the syntactic score and the semantic score.

Figure 4:
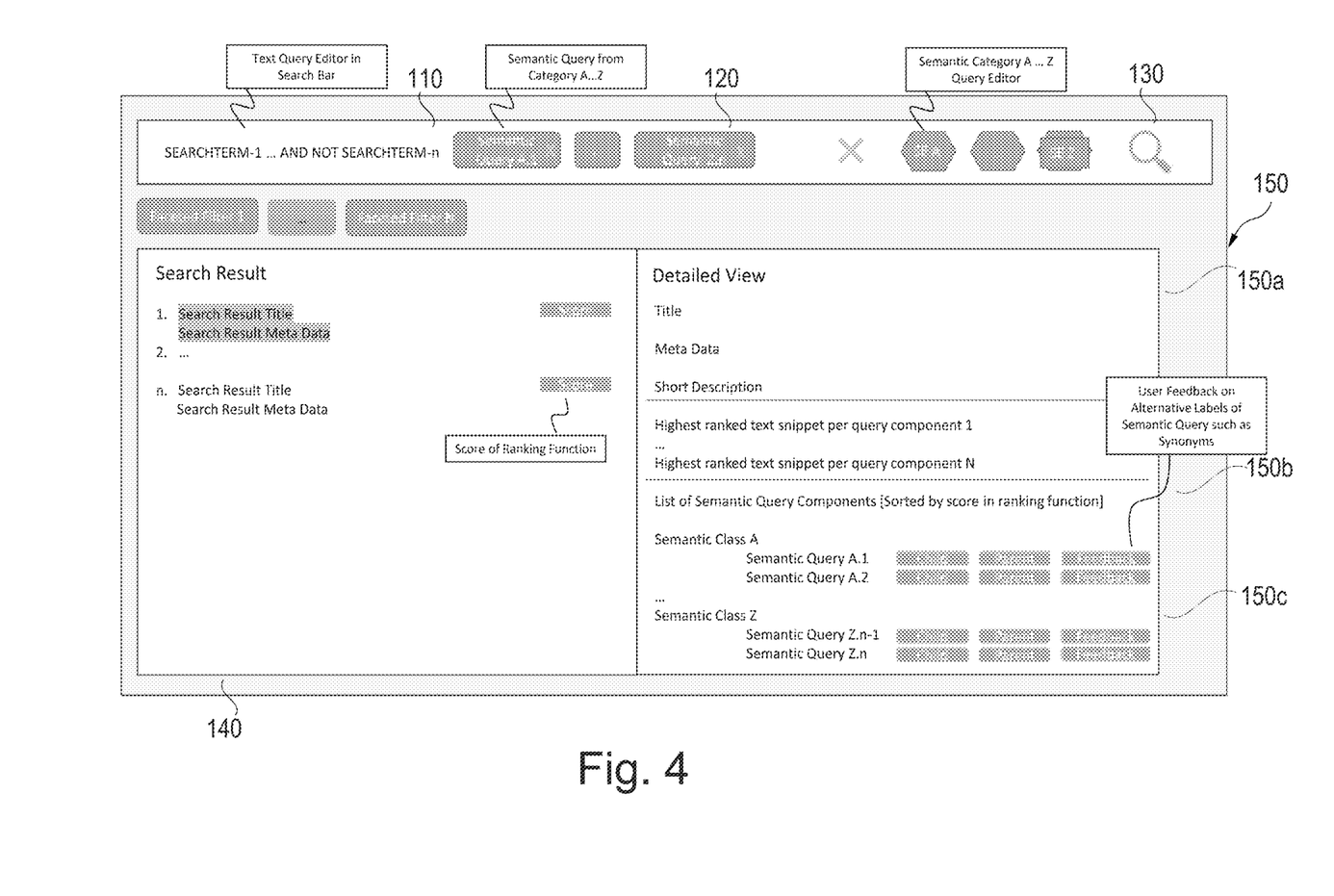
FIG. 4 illustrates an exemplary screen display from an example of a user interface designed to provide searching and displaying of corresponding search results as list and as detailed view of one data object selected from said list.

FIG. 4 is an exemplary screen display from an example of a user interface designed to provide searching in accordance with the techniques of the present disclosure. This screen display emphasizes particular features of a query language that has been designed to take advantage of combining the attributes of keyword style searching with syntactic and semantic searching.

With reference to FIG. 4, the user can enter a syntactic query in the text editor in search bar 110. The user may select one or more semantic categories A to Z in the query editor 120. One skilled in the art will recognize that it is also possible for a user to select a tab, one or more click-links, pull-down menus, text inputs, to provide the syntactic query and/or the at least one semantic query.

The semantic categories may be associated with expert domains relevant to a target user group. For example, the semantic categories may comprise one or more of organic chemical, inorganic chemical, polymer, and material comprising any of the former, biological species, chemical property, physical property, chemical reaction, process, and chemical, biological, and physical application. In another example, the semantic categories may comprise one or more of legal entity from business and/or academia, and product and brand name. In a further example, the semantic categories may comprise one or more of ingredients for manufacturing of regulated products, genome data, and proteome data. In a further example, the semantic categories may comprise one or more of an image and scientific plot.

When ready, the search is initiated by pressing the Search button 130. A summary of the search results is displayed in a first result area 140, along with a total score generated e.g. by the query processing module 80 in FIG. 3. Each search result may comprise a search result title and search result meta data. The detailed view of a particular search result is displayed in a second result area 150. In a first portion 150a of the second search area 150, the title, meta data, and a short description may be displayed. The highest ranked text snippet per query component 1 to N may be displayed in a second portion 150b. A list of semantic query components may be displayed in the third portion 150c. In this portion 150c, child and parent concepts for each queried semantic concept for each search result may be displayed, which may be generated by the processing unit 14 in FIG. 1. For example, if the queried semantic concept is "pesticide", the child concepts may include one or more of herbicide, insecticides (which may include insect growth regulators, termiticides, etc.), nematicide, molluscicide, piscicide, avicide, rodenticide, bactericide, insect repellent, animal repellent, antimicrobial, and fungicide. This may allow the users to broaden or limit the search results based on their expert knowledge. A user may also provide his/her feedback a user feedback on at least one semantic concept queried e.g. in the form of an alternative synonym and/or an alternative ontological connection. With the user feedback, semantic parsers 30 of FIG. 2 may improve the estimation of conditional probabilities for more precisely classifying natural language utterances into one of a set of predefined semantic categories.

Figure 5:
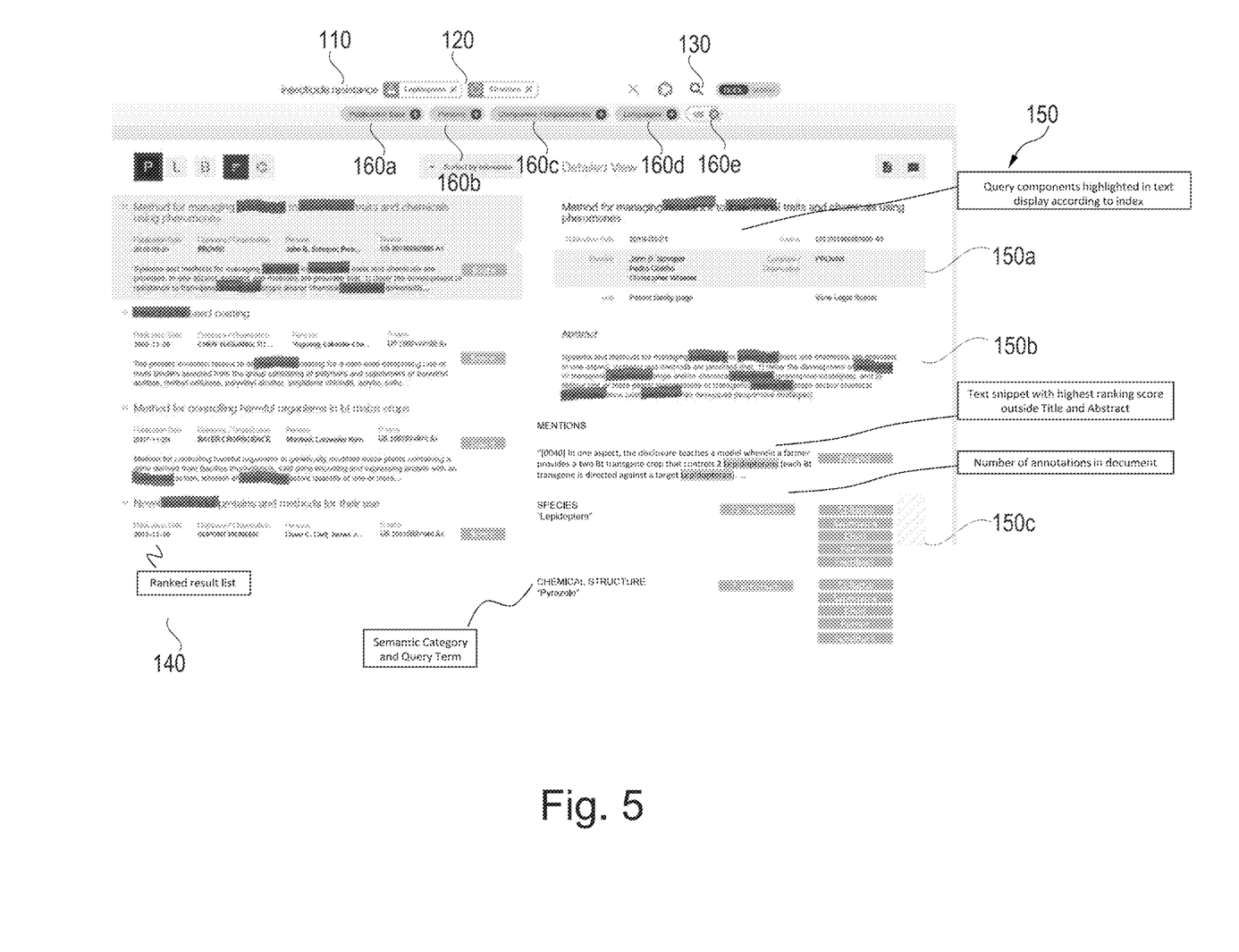
FIG. 5 illustrates an exemplary screen display of the format for displaying results in response to a syntactic query.

FIG. 5 is an exemplary screen display of the format for displaying results in response to a syntactic query. In this example, the syntactic query is entered in the search bar 110 and in this case indicates a search for everything related to insecticide resistance. Additionally, the at least one semantic query is entered in the query editor 120 and in this case indicates a semantic term "*lepidoptera*" in the semantic category "SPECIES" and further indicates a semantic category "STRUCTURE". There are also five components 160a, 160b, 160c, 160d, and 160e of this exemplary interface, which allow a user to further specify meta data information, such as publication data, persons, companies/organizations, languages, and countries, for further limiting the number of search results.

A summary of the search results is displayed in a first result area 140, along with a total score which is correlated with a count of the number of times the particular text query and semantic query terms occur in the data currently being displayed and summarized. The query term locations may be highlighted in the search results and in the document information.

The detailed view of a particular search result is displayed in a second result area 150. In a first portion 150a of the second search area 150, the title, meta data, and a short description (e.g. abstract in this example) may be displayed.

The highest ranked text snippet per query component (e.g. "Lepidopteran" in this example) may be displayed in a second portion 150b.

A list of semantic query components may be displayed in the third portion 150c. In this example, the semantic class "SPECIES" and the associated sematic queried term "*lepidoptera*" and the semantic class "CHEMICAL STRUCTURE" and the associated semantic queried term "Pyrazole" may be listed and displayed together with the number of notations in the documents.

Additionally, child and parent concepts for each queried semantic concept for each search result may be displayed. A user may also provide his/her feedback a user feedback on at least one semantic concept queried in the form of an alternative synonym and/or an alternative ontological connection. With the user feedback, semantic parsers 30 of FIG. 2 may improve the estimation of conditional probabilities for more precisely classifying natural language utterances into one of a set of predefined semantic categories.

Figure 6:
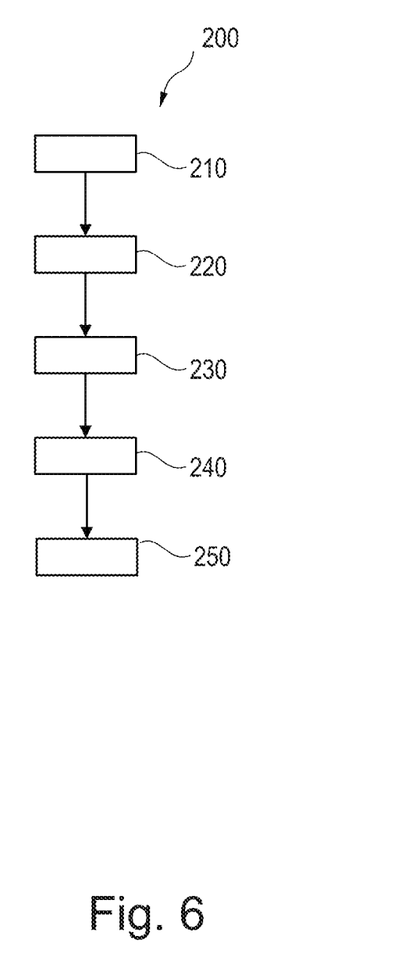
FIG. 6 illustrates the operations of an exemplary method 200 for performing a search on a corpus of data objects.

FIG. 6 illustrates the operations of an exemplary method 200 for performing a search on a corpus of data objects.

The computer-implemented method 200 may be implemented as a device, module or related component in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 200 may be written in any combination of one or more programming languages, including a language such as JAVA, SMALLTALK, C++, Python, TypeScript, JavaScript or the like and conventional procedural programming languages, such as the "C" programming language or similar programming languages.

In step 210, i.e. step a), an input channel receives a syntactic query and at least one semantic query e.g. from a user interface.

In step 220, i.e. step b), a processor matches the syntactic query against at least one syntactic search index data structure to obtain a first set of data objects, each of which has a set of terms that are syntactically related to the syntactic query. The syntactic search index data structure indexes and stores in a database a plurality of terms from the corpus of data objects along with syntactic annotations indicating syntactic information.

In step 230, i.e. step c), the processor further matches the at least one semantic query against at least one semantic search index data structure to obtain second set of the data objects, each of which has a set of terms that are semantically related to the at least one semantic query. The at least one semantic search index data structure indexes and stores in the database the plurality of terms from the corpus of data objects along with semantic annotations indicating semantic information.

In step 240, i.e. step d), the processor obtains an intersection of the first and second sets of data objects.

In step 250, i.e. step e), an output channel outputs information of the second set of data objects to a display.

Optionally, the at least one semantic query comprises a first semantic query and a second semantic query. The processor matches the first semantic query against a first semantic search index data structure to obtain a third set of data objects, each of which has a set of terms that are semantically related to the first semantic query. The processor matches the second semantic query against a second semantic search index data structure to obtain a fourth set of data objects, each of which has a set of terms that are semantically related to the second semantic query. The first and second semantic search index data structures are associated with different semantic query categories. The second set of data objects is an intersection of the third and fourth sets of data objects.

Optionally, the computer-implemented method further comprises the step of generating a total score for each of data objects from the intersection of the first and second sets of data objects according to their relevance to the syntactic query and to the at least one semantic query and ranking the data objects according to the total score.

Optionally, the computer-implemented method further comprises the step of prioritizing an output of the information of data objects from the intersection of the first and second sets of data objects with the total score within a reference score range.

Optionally, the computer-implemented method further comprises the steps of generating child and parent concepts for each of the at least one semantic query. The output unit is configured to output the generated child and parent concepts.

Optionally, the computer-implemented method further comprises the steps of receiving a user feedback on an alternative label of at least one semantic query, and updating the semantic annotations based on the user feedback.

One skilled in the art will recognize that, although the techniques are described primarily with reference to text-based languages and collections of documents, similar techniques may be applied to any collection of terms, phrases, units, images, or other objects that can be represented in syntactical units and that follow a grammar that defines and assigns roles to the syntactical units, even if the data object may not traditionally be thought of in that fashion. Examples include written or spoken languages, for example, English or French, computer programming languages, graphical images, bitmaps, music, video data, and audio data. Sentences that comprise multiple words are only one example of a phrase or collection of terms that can be analysed, indexed, and searched using the techniques described herein. One skilled in the art will recognize how to modify the structures and program flow exemplified herein to account for differences in types of data being indexed and retrieved. Essentially, the concepts and techniques described are applicable to any environment where the keyword style searching is contemplated.

All definitions, as defined and used herein, should be understood to control over dictionary definitions, definitions in documents incorporated by reference, and/or ordinary meanings of the defined terms.

The indefinite articles "a" and "an", as used herein in the specification and in the claims, unless clearly indicated to the contrary, should be understood to mean "at least one".

The phrase "and/or", as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" or, when used in the claims, "consisting of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either", "one of", "only one of", or "exactly one of".

As used herein in the specification and in the claims, the phrase "at least one", in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

In the claims, as well as in the specification above, all transitional phrases such as "comprising", "including", "carrying", "having", "containing", "involving", "holding", "composed of", and the like are to be understood to be open-ended, i.e., to mean including but not limited to. Only the transitional phrases "consisting of" and "consisting essentially of" shall be closed or semi-closed transitional phrases, respectively.

Furthermore, in this detailed description, a person skilled in the art should note that quantitative qualifying terms such as "generally", "substantially", "mostly", and other terms are used, in general, to mean that the referred to object, characteristic, or quality constitutes a majority of the subject of the reference. The meaning of any of these terms is dependent upon the context within which it is used, and the meaning may be expressly modified.

In another exemplary embodiment of the present invention, a computer program or a computer program element is provided that is characterized by being adapted to execute the method steps of the method according to one of the preceding embodiments, on an appropriate system.

The computer program element might therefore be stored on a computer unit, which might also be part of an embodiment of the present invention. This computing unit may be adapted to perform or induce a performing of the steps of the method described above. Moreover, it may be adapted to operate the components of the above described apparatus.

The computing unit can be adapted to operate automatically and/or to execute the orders of a user. A computer program may be loaded into a working memory of a data processor. The data processor may thus be equipped to carry out the method of the invention.

This exemplary embodiment of the invention covers both, a computer program that right from the beginning uses the invention and a computer program that by means of an update turns an existing program into a program that uses the invention.

Further on, the computer program element might be able to provide all necessary steps to fulfil the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section.

A computer program may be stored and/or distributed on a suitable medium, such as an optical storage medium or a solid state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

All features can be combined to provide a synergetic effect that is more than the simple summation of the features.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:

1. An information retrieval system for performing a search on a corpus of data objects, comprising:
   a database configured to store at least one syntactic search index data structure and at least one semantic search index data structure;
   wherein the at least one syntactic search index data structure is configured to index and store in the database a plurality of terms from the corpus of data objects along with syntactic annotations indicating syntactic information;
   wherein the at least one semantic search index data structure is configured to index and store in the database the plurality of terms from the corpus of data objects along with semantic annotations indicating semantic information; and
   a device comprising:
   an input unit;
   a processing unit; and an output unit;
   wherein the input unit is configured to receive a syntactic query and at least one semantic query;
   wherein the processing unit is configured to match the syntactic query against the at least one syntactic search index data structure to obtain a first set of data objects, each of which has a set of terms that are syntactically related to the syntactic query;
   wherein the processing unit is configured to match the at least one semantic query against the at least one semantic search index data structure to obtain a second set of the data objects, each of which has a set of terms that are semantically related to the at least one semantic query;
   wherein the processing unit is configured to obtain an intersection of the first and second sets of data objects; and
   wherein the output unit is configured to provide information of the intersection of the first and second sets of data objects.

2. Information retrieval system according to claim 1,
   wherein the at least one semantic query comprises a first semantic query and a second semantic query;
   wherein the processing unit is configured to match the first semantic query against a first semantic search index data structure to obtain a third set of data objects, each of which has a set of terms that are semantically related to the first semantic query;
   wherein the processing unit is configured to match the second semantic query against a second semantic search index data structure to obtain a fourth set of data objects, each of which has a set of terms that are semantically related to the second semantic query; and
   wherein the second set of data objects is an intersection of the third and fourth sets of data objects.

3. Information retrieval system according to claim 1,
   wherein the processing unit is configured to generate a total score for each of data objects from the intersection of the first and second sets of data objects according to their relevance to the syntactic query and to the at least one semantic query and to rank the data objects according to the total score.

4. Information retrieval system according to claim 3,
   wherein the processing unit is configured to prioritize an output of the information of data objects from the intersection of the first and second sets of data objects with the total score within a reference score range.

5. Information retrieval system according to claim 1,
wherein the processing unit is configured to generate child and parent concepts for each of the at least one semantic query; and
wherein the output unit is configured to output the generated child and parent concepts.

6. Information retrieval system according to claim 1,
wherein the input unit is configured to receive a user feedback on an alternative label of one or more of the at least one semantic query; and
wherein the processing unit is configured to update the semantic annotations based on the user feedback.

7. Information retrieval system according to claim 1,
wherein the at least one semantic search index structure is configured to store semantic indexing of an expert domain relevant to a target user group.

8. Information retrieval system according to claim 7,
wherein the expert domain comprises at least one of:
organic chemical;
inorganic chemical;
polymer; and
material comprising any of the former;
biological species;
chemical property;
physical property;
chemical reaction;
process;
chemical, biological, and physical application;
specification of an technical object, technical process, and/or technical component part;
specification of manufacturing process to manufacture any of the former; and
regulatory legal text or part thereof comprising environmental, health, and/or safety regulation information.

9. Information retrieval system according to claim 7,
wherein the expert domain comprises at least one of:
legal entity from business, governmental administration, public services, international organization, non-profit organization, and/or academia;
geographical location of legal entity; and
product and brand name.

10. Information retrieval system according to claim 7,
wherein the expert domain comprise at least one of:
ingredients for manufacturing of regulated products;
genome data; and
proteome data.

11. Information retrieval system according to claim 7,
wherein the expert domain comprises at least one of:
image; and
scientific plot.

12. Information retrieval system according to claim 1,
wherein the database is configured to store meta data of each of data objects in the corpus;
wherein the input unit is configured to receive a metadata query;
wherein the processing unit is configured to obtain a fifth set of data objects from the intersection of the first and second sets of data objects based on the metadata query; and
wherein the output unit is configured to output information of the fifth set of data objects.

13. Information retrieval system according to claim 1, wherein the device further comprises a display configured to display the information of the intersection of the first and second sets of data objects.

14. A computer-implemented method for performing a search on a corpus of data objects, comprising:
a) receiving, via an input channel, a syntactic query and at least one semantic query;
b) matching, by a processor, the syntactic query against at least one syntactic search index data structure in a database to obtain a first set of data objects, each of which has a set of terms that are syntactically related to the syntactic query, wherein the syntactic search index data structure indexes and stores in a database a plurality of terms from the corpus of data objects along with syntactic annotations indicating syntactic information;
c) matching, by the processor, the at least one semantic query against at least one semantic search index data structure in the database to obtain second set of the data objects, each of which has a set of terms that are semantically related to the at least one semantic query, wherein the at least one semantic search index data structure indexes and stores in the database the plurality of terms from the corpus of data objects along with semantic annotations indicating semantic information;
d) obtaining, by the processor, an intersection of the first and second sets of data objects; and
e) providing, via an output channel, information of the intersection of the first and second sets of data objects.

15. A non-transitory computer readable medium having stored thereon a program element of, which when being executed by a processor to carry out the method of claim 14.

* * * * *